Nov. 15, 1932.  J. L. HULBERT  1,888,040
CONNECTER FOR MILKING MACHINES
Filed July 5, 1928  2 Sheets-Sheet 2

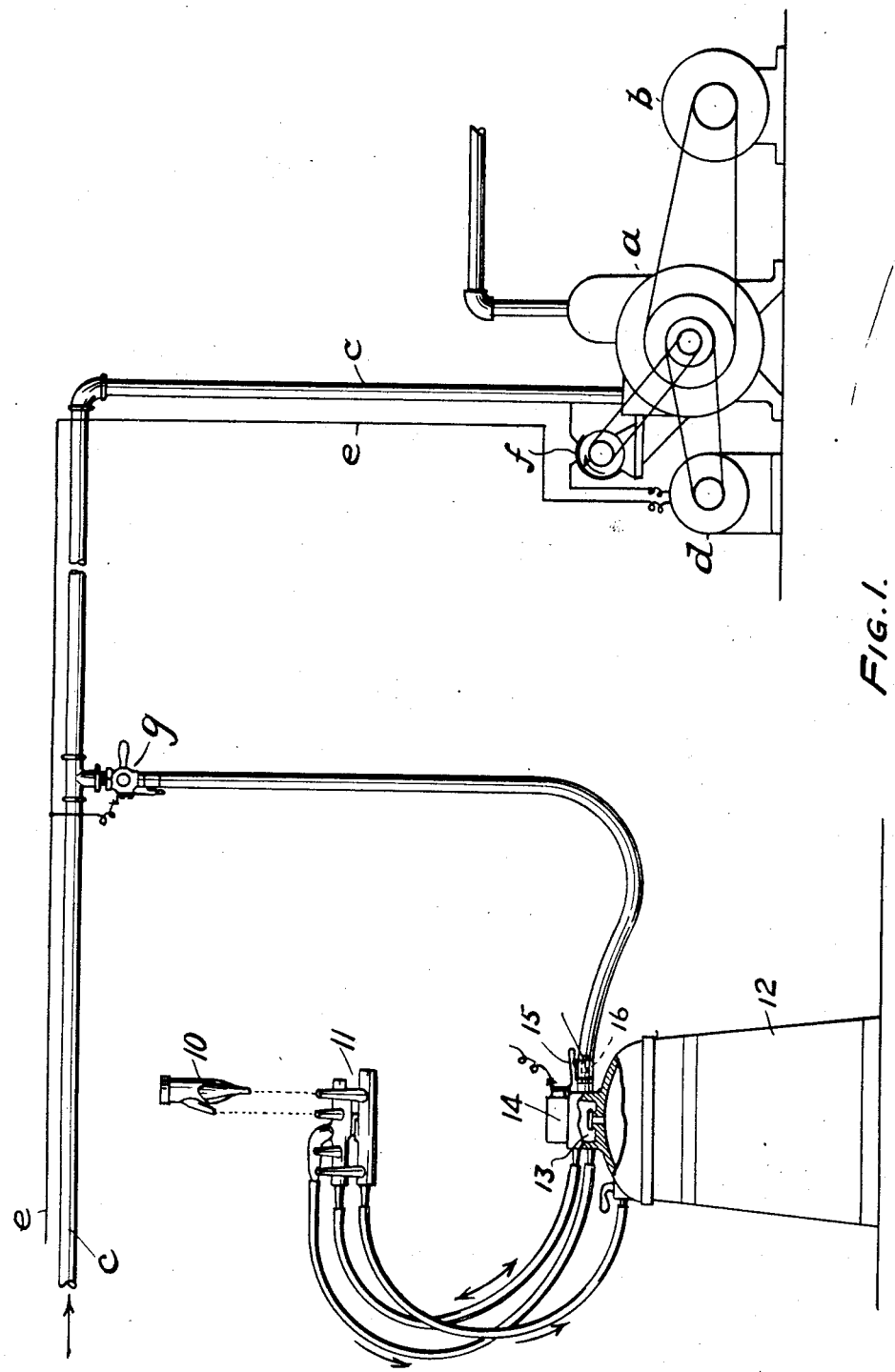

WITNESS:
Rob't R. Kitchel.

INVENTOR
John L. Hulbert
BY
Busser and Harding
ATTORNEYS.

Patented Nov. 15, 1932

1,888,040

UNITED STATES PATENT OFFICE

JOHN L. HULBERT, OF POUGHKEEPSIE, NEW YORK, ASSIGNOR TO THE DE LAVAL SEPARATOR COMPANY, OF NEW YORK, N. Y., A CORPORATION OF NEW JERSEY

CONNECTER FOR MILKING MACHINES

Application filed July 5, 1928. Serial No. 290,359.

In the art of milking machines, it is known to provide a vacuum pipe line connected with a vacuum pump and provided with cocks to either of which is connectible a separate hose, which is in turn connectible with the vacuum chamber of a milking machine unit, such vacuum chamber being connectible, through a milk tube, with the inner chambers of a set of teat cups. It is also known to connect the outer or pulsation chambers of the teat cups with a pulsation tube, and to provide a primary pneumatic pulsator which will connect said pulsation tube, either directly or through a secondary pneumatic pulsation, alternately with atmosphere and with said vacuum chamber and thereby transmit pneumatic pulsations to the pulsation chambers of the teat cups. It is also known to operate the primary pulsator by means of an electromagnet and to operate the magnet through an electric circuit, which is closed through the magnet when the hose is connected at one end to the vacuum pipe line and at the other end to the vacuum chamber of the milking machine unit. Such a pneumatically and electrically operated milking machine is set forth in an application filed by C. H. Hapgood December 24, 1927, Serial No. 242,329. In said application, one pole of the electric generator is connected with the vacuum pipe line and the other pole with a terminal adjacent to each cock; one pole of the magnet is connected to the nozzle communicating with the vacuum chamber on the milk pail and the other with a terminal adjacent thereto; and the hose carries two wires which complete the circuit when the hose is connected at opposite ends to said cock and nozzle; there being means to open and close the circuit (that is, to produce electric pulsations therein) so as to intermittently energize the magnet and thereby actuate the primary pneumatic pulsator.

The object of the present invention is to provide an improved pneumatic and electric connecter which is applicable to either end of the hose above described. The invention is also applicable to any type of milking machine wherein pneumatic and electric connections are desired to be made between one end of a hose, tube or pipe having a penumatic chamber or conduit and an electric terminal. The invention has for its more particular object the provision of a connecter of this character which will make the connections positive until intentially broken and which will avoid the possibility of air leakage.

In the accompanying drawings, which illustrate an embodiment of the invention:

Fig. 1 is a side elevation, partly in section, of a complete milking machine.

Figure 4:
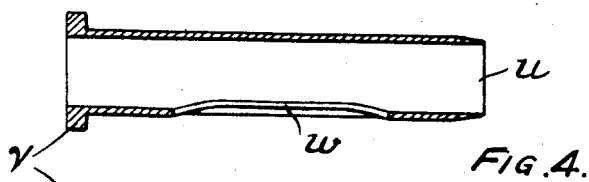
Fig. 4 is a longitudinal sectional view of one of the ferrules that is forced into the end of the rubber tube.
Figure 5:
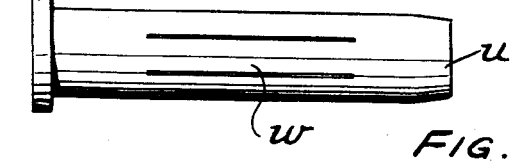
Fig. 5 is a side view of the same.

A pump $a$ is driven by a motor $b$ and exhausts air from a vacuum pipe line $c$ to a vacuum of about 15 inches of mercury. An electric generator $d$ driven from the pump has one terminal connected to a wire $e$ extending along pipe line $c$ and the other to a contact device $f$ (also driven from pump $a$) that intermittently electrically connects it to pipe line $c$.

The milking machine unit may be of the type shown in said Hapgood application and in Fig. 1 herein. The teat cups 10 are connected through a combination cluster and secondary pulsator 11, with the milk pail 12 provided with a vacuum chamber 13 and carrying an electrically operable primary pulsator 14 for transmitting pneumatic pulsations to the secondary pulsator 11. The poles of the electro-magnet of the primary pulsator 14 are connected respectively to a spring 15 similar to spring $n$ and to a nozzle 16 similar to nozzle $y$.

Figure 2:
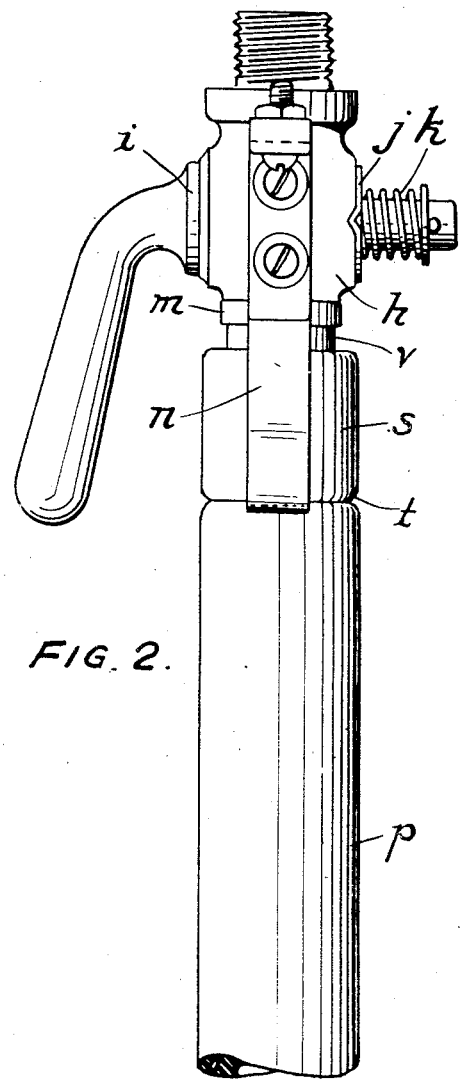
Fig. 2 is a front view of the connecter and a portion of a rubber tube or hose in operating position.
Figure 3:
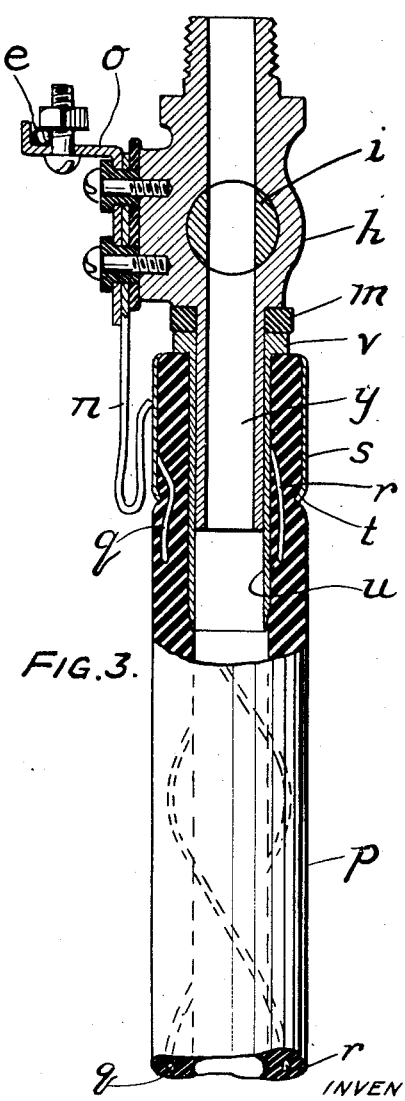
Fig. 3 is a longitudinal section of the same.

At intervals corresponding to the stanchions, the pipe line is provided with combination cocks and electric connecters shown in detail in Figs. 2 and 3.

Referring to Figs. 2 and 3: $h$ is a cock body in which a plug $i$ is turnable and which may be locked in either position by lugs on the washer $j$, which is under pressure from spring $k$, entering notches in the body. The lower end of the cock terminates in a tube or nozzle $y$ having a soft packing ring $m$ around its neck.

Mechanically attached to but electrically insulated from the cock are a spring $n$ and a clamp $o$ for securing the wire $e$ to spring $n$.

A rubber tube $p$ provides pneumatic connection between the cock and the milking machine itself, as hereinafter described, and has in its walls two wires $q$ and $r$ which transmit electrical impulses. One of these wires, $q$ has its end attached to a ring $s$ around the end of the rubber tube. This ring has, at its end farthest from the end of the tube, an inturned edge $t$ that locally restrains the tube to an outside diameter smaller than normal. The other wire $r$ has its end attached to a metal liner or ferrule $u$, which is forced inside the tube, thereby tightly gripping the tube between the ferrule and the inturned edge $t$. This ferrule is provided at one end with a collar $v$ and intermediate of its length has cut in it two longitudinal slits forming a tongue $w$, which is bent to form a spring extending nearer than the tube itself to the tube's center.

The end of the spring $n$ is so bent that it presents a sharp corner rather than a flat face to the ring $s$.

While, for simplicity of wording, some of the claims specify a male member on the cock and a female member in the flexible tube, I intend to include thereby the obvious reversal of parts wherein a cock has a tubular extension in which a metallic tube extending from the flexible tube may be inserted.

Both ends of the flexible tube $p$ may have the same equipment, so that the tube at one end may be pneumatically and electrically connected to the milking machine unit in the same manner that it is pneumatically and electrically connected at the other end with the vacuum pipe line $c$ and the circuit from the generator $d$ as hereinbefore described.

What I claim and desire to protect by Letters Patent is:

1. A combined pneumatic and electric connecter comprising a flexible hose member, a body having a pneumatic conduit member, a metal liner in one of said members and a shouldered metal tube carried by the other member and adapted to enter said liner, and a soft ring adapted to surround said tube and be compressed between said shoulder and the end of the metallic liner, thereby making an air tight joint.

2. A combined pneumatic and electric connecter comprising a member having a pneumatic conduit, a tubular extension on said member, a flexible tube, a ferrule in the end of said tube, said tubular extension adapted to extend into said ferrule, an electric contact ring surrounding the tube and having an inturned edge adapted to grip the tube between said edge and the ferrule and an electric conductor carried by the tube and in electrical connection with said ring.

3. A combined pneumatic and electric connecter comprising a body having a pneumatic conduit, a tubular extension on the body communicating with said conduit, a flexible hose, a metal liner in said end of the hose and adapted to be slipped over said tubular extension, a ring gripping the hose adjacent its said end, two wires embedded in the hose and in electrical contact with said ring and liner respectively, an electric conductor carried by and insulated from said body and electrically contacting with said ring when the hose is attached to said body, said hose and liner adapted to enclose the major part of the length of said tubular extension when said parts are connected, and means providing an air-tight joint between said liner and said body.

4. A combined pneumatic and electric connecter comprising a flexible hose, a body having a pneumatic conduit, a metal liner member in the hose, a shouldered metal tubular member carried by said body, a soft ring adapted to surround said tubular member and be compressed between said shoulder and the end of the metal liner member, thereby making an air-tight joint, an electrical conductor in electrical connection with said metal liner member, one of said metallic members having a portion so bent as to press against the other to form an electric contact.

5. A combined pneumatic and electric connecter comprising a shouldered body having a pneumatic conduit, a tubular extension from said body, a packing ring surrounding the tubular extension adjacent the shoulder, a bent spring mechanically attached to but insulated from said body, a flexible tube, a ferrule inside the end of the tube adapted to slide over said extension against said packing ring, a metallic ring surrounding the end of the tube and making contact with said spring, and wires embedded in the tube wall, one wire being electrically connected to said ferrule and the other to said ring.

6. A combined pneumatic and electric connecter comprising a shouldered body having a pneumatic conduit, a tubular extension from said body, a packing ring surrounding the tubular extension adjacent the shoulder, a bent spring mechanically attached to but insulated from said body, a flexible tube, a ferrule inside the end of the tube adapted to slide over said extension against said packing ring, a metallic ring surrounding the end of the tube and making contact with said spring, and wires embedded in the tube wall, one wire being electrically connected to said ferrule and the other to said ring, said spring being so bent as to present a sharp corner to said metallic ring.

7. A combined pneumatic and electric connecter comprising a shouldered body having a pneumatic conduit, a tubular extension from said body, a packing ring surrounding the tubular extension adjacent the shoulder, a bent spring mechanically attached to but insulated from said body, a flexible tube, a ferrule inside the end of the tube adapted to slide over said extension against said packing ring, a metallic ring surrounding the end of the tube and making contact with said spring, and wires embedded in the tube wall, one wire being electrically connected to said ferrule and the other to said ring, and a tongue on said ferrule which is bent to make electrical contact with said tubular extension.

In testimony of which invention, I have hereunto set my hand at Poughkeepsie, New York, on this thirtieth day of June, 1928.

JOHN L. HULBERT.